Figure 1:
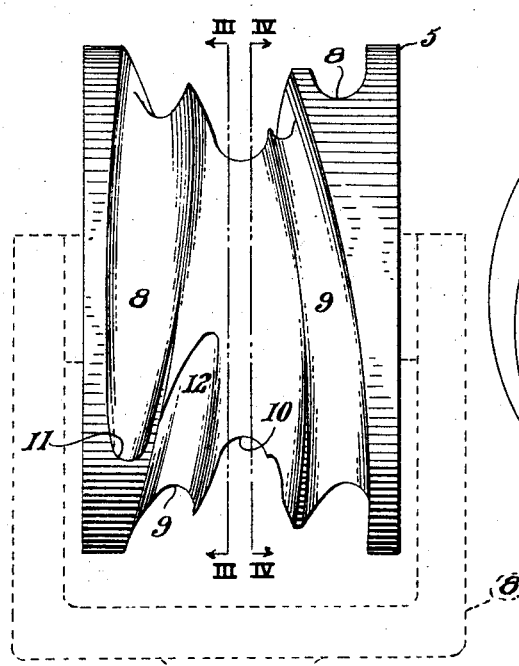

L. KARANDYSZEWSKI.
TROLLEY FINDER.
APPLICATION FILED MAY 5, 1921.

1,391,387.

Patented Sept. 20, 1921.

Inventor
L. Karandyszewski
By J. K. Bryant.
Attorney

UNITED STATES PATENT OFFICE.

LUDWIK KARANDYSZEWSKI, OF SCHENECTADY, NEW YORK.

TROLLEY-FINDER.

1,391,387.  Specification of Letters Patent.  Patented Sept. 20, 1921.

Application filed May 5, 1921. Serial No. 467,135.

*To all whom it may concern:*

Be it known that I, LUDWIK KARANDYSZEWSKI, a citizen of Poland, residing at Schenectady, in the county of Schenectady and State of New York, have invented certain new and useful Improvements in Trolley-Finders, of which the following is a specification.

This invention relates to certain new and useful improvements in trolley finders and has particular reference to that type of finder known as the spiral cam trolley wheel or collector.

The primary object of the invention is to improve devices of this kind by the provision of a plurality of spiral grooves at each side of the radial center of the wheel with the spiral grooves arranged in overlapping relation and with each groove extending only partially around the periphery of the wheel so that entrance points are provided at opposite sides of the periphery of the wheel so that said wheel may be more readily engaged with the wire for leading it to the center of the wheel, the individual cam grooves being of abrupt pitch so as to cause quick return of the wire to the center of the wheel and the overlapping arrangement of the grooves permitting construction of the wheel with a minimum width.

With the above general objects in view and others that will appear as the nature of the invention is better understood, the invention consists in the novel form, combination and arrangement of parts hereinafter more fully described in connection with the accompanying drawings, in which like reference characters indicate corresponding parts throughout the several views.

Figure 2:
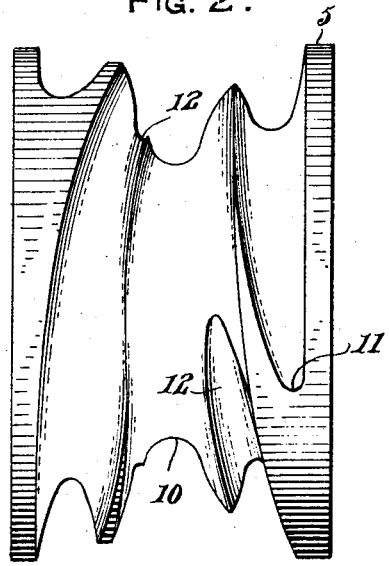
Figure 3:
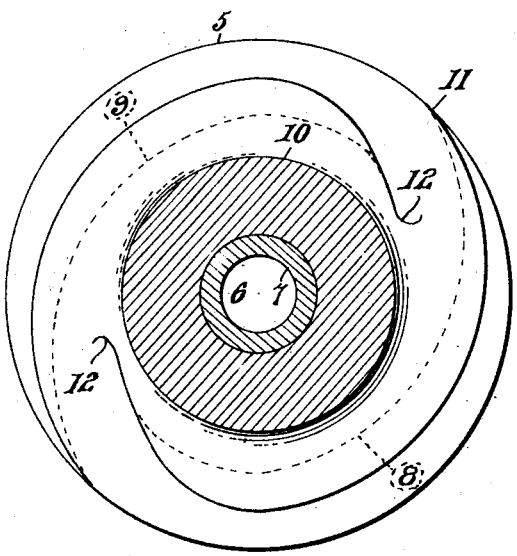
Figure 4:
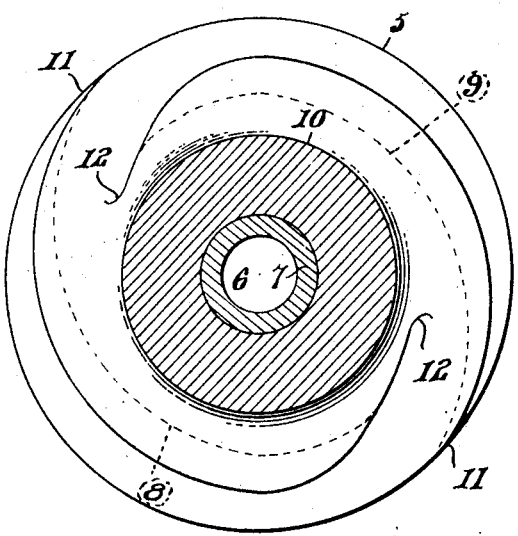

In the drawings,

Figure 1 is an edge elevational view of a trolley finder constructed in accordance with the present invention, the mount for the finder being indicated by dotted lines, Fig. 2 is a view similar to Fig. 1 looking at the wheel in a different position, Fig. 3 is a radial sectional view taken upon line III—III of Fig. 1, and Fig. 4 is a view similar to Fig. 3 taken upon line IV—IV of Fig. 1.

Referring more in detail to the several views, the present invention embodies a trolley finder in the nature of a pulley or grooved wheel 5 which is preferably formed in one piece as by casting or the like and so as to provide a central axial opening 6 in which is fixed a bearing sleeve 7 for mounting upon a suitable pintle, not shown, usually carried by the fork or head 8 indicated by dotted lines in Fig. 1. At opposite sides of the radial center of the wheel, a pair of overlapping spiral cam grooves 8 and 9 are provided in the periphery of the wheel, the grooves at one side of the radial center being of left hand pitch and those at the other side thereof being of right hand pitch so that upon forward movement of the wheel and rotation of the latter by engagement with the trolley wire, said wire will be led from either side of the wheel to a central groove of annular form which is provided as at 10 between the cam grooves 8 and 9. Each cam groove extends from a point adjacent one side of the wheel as at 11 to a point substantially opposite the point 11 as at 12 where said groove terminates near the radial center of the wheel in communication with the central annular groove 10, the grooves 8 and 9 at each side being thus arranged in overlapping relation and each of said grooves 8 and 9 being of such abrupt pitch as to insure quick movement of the wire to the central groove 10. An advantage of providing a pair of overlapping spiral grooves at each side of the radial center of the wheel is that the wire may be more readily engaged at a point 11 than if only one of such points were present as in the usual single grooves now employed. By extending each groove only partially around the periphery of the wheel, two grooves may be provided without increasing the width of the trolley wheel as would be necessary if two grooves were provided in parallel relation at each side. Thus, economy is had with respect to material used while the weight of the wheel is kept to a minimum and the advantages of plural grooves at each side is not only had, but the abrupt pitch of the grooves insures quick replacement of the wire in the central groove 10.

In view of the foregoing description, it is believed that the construction and operation as well as the advantages of the present invention will be readily understood and appreciated by those skilled in the art.

Minor changes may be made without departing from the spirit and scope of the invention as claimed.

What is claimed as new is:

A trolley finder in the form of a wheel having a central annular groove about the periphery thereof and formed with a pair of overlapping spiral cam grooves at each side of said annular groove, the cam grooves at one side being of a pitch opposite to the pitch of those at the other side, and grooves extending from different points on the periphery of the wheel adjacent one side of the latter completing but a one-half circle around the periphery of the wheel where they terminate in communication with said central groove, the spiral grooves at each side of the annular groove being in overlapping relation and within the same radial plane.

In testimony whereof I affix my signature in presence of two witnesses.

LUDWIK KARANDYSZEWSKI.

Witnesses:
   PETER KARANDYSZEWSKI,
   JÓZEF MAGDA.